United States Patent [19]

Beauvais

[11] Patent Number: 5,708,589
[45] Date of Patent: Jan. 13, 1998

[54] ERROR RECOVERY SYSTEM FOR AN ENERGY CONTROLLER FOR AN ELECTRIC WATER HEATER

[75] Inventor: David L. Beauvais, North Andover, Mass.

[73] Assignee: Vaughn Manufacturing Corporation, Salisbury, Mass.

[21] Appl. No.: 629,232

[22] Filed: Apr. 8, 1996

[51] Int. Cl.$^6$ .............................. G06F 1/18; G06F 1/28; H02J 1/00; H02J 3/14
[52] U.S. Cl. .............. 364/492; 364/483; 395/750; 395/181; 395/183.18; 395/185.01; 307/35; 307/38; 307/40; 307/41
[58] Field of Search ............... 364/492, 464, 364/464.04, 483; 395/750, 800, 182.13, 182.16, 182.2, 182.22, 183.18, 185.01; 307/35, 40, 41, 39, 29, 52, 66, 64, 38, 125, 130

[56] References Cited

U.S. PATENT DOCUMENTS

| | | | |
|---|---|---|---|
| 4,213,174 | 7/1980 | Morley et al. | 364/145 |
| 4,361,877 | 11/1982 | Dyer et al. | 364/464.04 |
| 4,763,333 | 8/1988 | Byrd | 395/182.2 |
| 4,815,097 | 3/1989 | Bellan | 373/107 |
| 4,998,024 | 3/1991 | Kirk et al. | 307/40 |
| 5,216,357 | 6/1993 | Coppola et al. | 324/142 |
| 5,301,122 | 4/1994 | Halpern | 364/483 |
| 5,414,861 | 5/1995 | Horning | 395/750 |
| 5,438,679 | 8/1995 | Inomata et al. | 395/800 |

*Primary Examiner*—Emanuel T. Voeltz
*Assistant Examiner*—Demetra R. Smith
*Attorney, Agent, or Firm*—Lane, Aitken & McCann

[57] ABSTRACT

A data protection and recovery system for an energy controller for a water heater is disclosed. The energy controller is a microprocessor based system which includes a central processing unit, volatile and non-volatile memories, and a clock. It functions to energize the water heater only during a certain period of the day. During normal operation of the system, the system uses the volatile memory as a workspace, and normally copies data in the volatile memory to the non-volatile memory. The system senses electrical disturbances, such as power surges, and prevents the writing of any data to the non-volatile memory components during the electrical disturbance. After the electrical disturbance subsides, the system checks the integrity of the data written to the volatile memory, and if it was not corrupted by the electrical disturbance, the data is then written to the non-volatile memory. If the data in the volatile memory was corrupted by the electrical disturbance, the system copies the data from the non-volatile memory to the volatile memory, and the system is restarted.

14 Claims, 2 Drawing Sheets

ERROR RECOVERY SYSTEM FOR AN ENERGY CONTROLLER FOR AN ELECTRIC WATER HEATER

FIELD OF THE INVENTION

The present invention relates to a data protection and error recovery system for an energy controller for electric water heaters.

RELATED PATENTS

The present invention is related to U.S. Pat. No. 4,998,024, issued to William J. Kirk, James F. Vaughn, Jr., and Lloyd R. Slonim, and assigned to the Vaughn Manufacturing Corporation, for an Energy Controlling System for Time Shifting Electric Power Use, and is hereby incorporated by reference.

BACKGROUND OF THE INVENTION

An energy controlling system for time shifting electric power use is disclosed in U.S. Pat. No. 4,998,024 to Kirk et. al. The system of the '024 patent reduces the power usage by a water heater during peak periods i.e. business hours) by automatically shifting the energization of the water heater to periods of off-peak power use (i.e. non-business hours). The system of the '024 patent contains a microprocessor which controls the application of power to the water heater. The system of the '024 patent also allows one to override the system and supply energy to the water heater during peak periods, or to turn off the system for a certain period of time, for example, when the owner is on vacation and no hot water is required.

The above-described system however is susceptible to failure as a result of electrical disturbances in the system such as power surges, power flicker or electrical noise. Such electrical disturbances can interfere with and alter the signals which represent data in the system, thereby corrupting that data which in turn will more than likely cause the system to malfunction.

OBJECTIVES

It is an object of the invention to protect the data in an energy controller system for an electric water heater.

It is another object of the invention to detect corrupted data in the energy controller system.

It is a further object of the invention to correct any corrupted data in the energy controller system.

SUMMARY OF THE INVENTION

The present invention provides a system which protects the data of, and recovers from data errors in, an energy controller for an electric water heater. It is a microprocessor based system having a central processing unit (CPU), a random access memory (RAM), an electrically erasable programmable read only memory (EEPROM), and a clock which has associated with it a small amount of memory. The energy controller energizes the water heater during non-peak periods of energy usage and cuts off power to the water heater during peak periods of energy usage.

The data which is used to operate the system is maintained in the EEPROM and the clock. When the system first starts up, the data in the EEPROM is copied to the RAM so that the RAM is a mirror image of the EEPROM. The CPU uses the data in the RAM and the time of the clock for its calculations to determine whether or not to close a switch and energize the water heater. By working with the data in the RAM, the data in the EEPROM is thereby protected. Any changes to the data are first written to the RAM, and then, after verifying the integrity of the data, the contents of the RAM are copied to the EEPROM for permanent storage. If an error is detected in the data in the RAM, the contents of the EEPROM are copied to the RAM to restore the system. Meanwhile, the clock maintains a record of the current date and time which is saved into the memory of the clock every minute. Consequently, if the date or time in the clock becomes corrupted, the date and time saved in the memory of the clock is copied to the clock to restore the clock.

The invention prevents the corruption of data in the system by detecting a change in the power level in the system caused by power surges, power flicker or high levels of electrical noise. The invention responds to such a condition by preventing the CPU from writing to non-volatile memory, i.e. the EEPROM or the clock, since this condition may cause the data in the EEPROM or the clock to become corrupted. This is referred to as the blocking phase. During the blocking phase, which lasts for a predetermined length of time (the blocking time), data is written only to the RAM. The blocking time allows for the power flicker or other electrical disturbance to subside.

The system uses a cyclical redundancy check (CRC) to determine if the data in the RAM has become corrupted, and an algorithm to determine if the date and time in the clock have become corrupted. If the data is not corrupted in the RAM, and if the blocking time has expired, the data in the RAM is written to the proper location in the EEPROM. However, if the data is corrupted, the data is not written to the EEPROM. Rather, after the delay of a recovery period which assures that the electrical disturbance has subsided, the data in the EEPROM is copied to the RAM since the EEPROM has the latest copy of correct data. Similarly, the system implements an algorithm which verifies the integrity of the date and time in the clock. It checks such things as making sure that the hour in the clock is between 1 and 12 inclusive. If the time in the clock is valid, the system continues in its operation. If the system detects an error in the clock, the system restores the clock with the time saved in the memory of the clock.

The system also checks the integrity of the data in the RAM and the clock irrespective of the absence of any electrical disturbance. The CPU checks the data in RAM and the clock as described above at regular intervals, and if it detects a problem with the data, the system enters a recovery time period. After the recovery time period, the data in the EEPROM is copied to the RAM and the data in the clock's memory is used to restore the clock.

DETAILED DESCRIPTION OF THE PREFERRED EMBODIMENTS

A. Basic Operation of the Energy Controller

Figure 1:
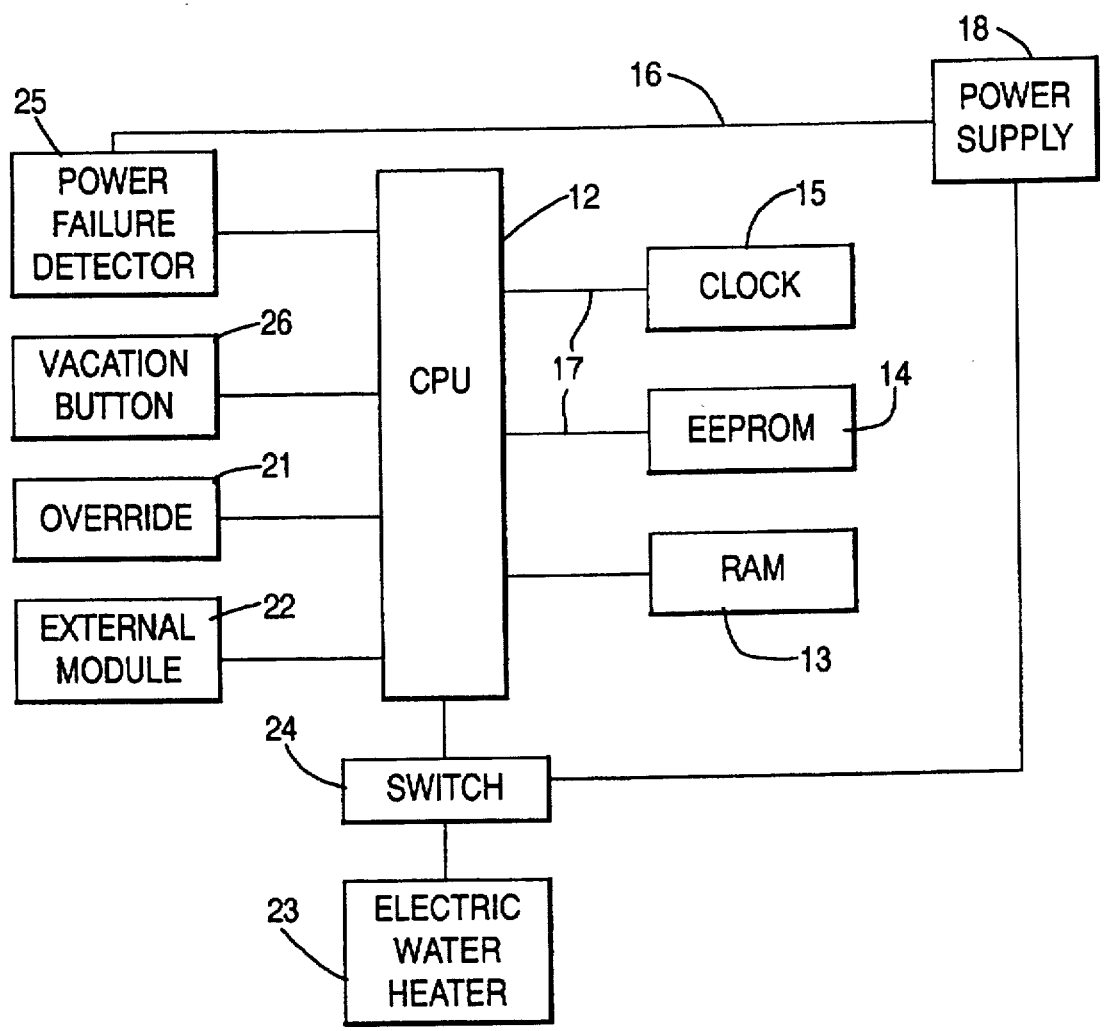
FIG. 1 is a schematic of an energy controller for a water heater used to implement the present invention.

An energy controller system for an electric water heater is illustrated in FIG. 1. A central processing unit 12 (CPU) is connected via signal lines 17 to a random access memory (RAM) 13, an electronically erasable programmable read only memory (EEPROM) 14, and a clock 15. The CPU 12 is also connected to an override switch 21, an external module 22, a power switch 24 controlling the application of power to an electric water heater 23, and a power failure detector 25. A power supply 18 supplies power through power supply lines 16 to the CPU 12, the RAM 13, the EEPROM 14, the clock 15, and the electric water heater 23 through the power switch 24. Both the EEPROM 14 and clock 15 contain non-volatile memory. The EEPROM 14 contains the dates of holidays, and it also contains counters to keep track of the current year, month, Julian date, day of the month, day of the week, and the number of times that a day has already occurred in a particular month. The EEPROM 14 further contains an algorithm which is executed by the CPU 12 and which compares the date and time in the clock 15 with the dates of the holidays contained in the EEPROM 14. The algorithm also calculates holidays which do not fall on the same date every year by examining the contents of the counters. The system uses the results of these calculations to determine whether or not to energize the water heater 23 for the entire 24 hour day. During operation of the system, the contents of the EEPROM 14 are copied to the RAM 13, and the CPU 12 uses the data and algorithm in the RAM 13 to control the system. Subsequently, at regular intervals, if no errors have occurred in the system, the system updates the EEPROM 14 by copying the contents of the RAM 13 to it.

The system energizes the water heater 23, i.e. heats the water, during off-peak hours of energy usage, and, except on holidays and weekends, cuts off power to the water heater 23 during peak hours of energy usage. Peak hours of energy usage roughly correspond to business hours, and off-peak hours of energy usage roughly correspond to non-business hours. The purpose of the system is to energize the water heater 23 while a residential customer may be at home and requires more hot water, and also to prevent the energizing of the water heater 23 when the customer is likely to be away from home and the need for hot water is reduced. Even though the system does not energize the water heater 23 during peak hours, hot water is still available because of the heat storage capacity of the water heater 23. This controlled energization of the water heater 23 (1) saves the customer money, and (2) eases the demand for power during peak hours thereby reducing the cost to the utility supplying the electric power.

The CPU 12 controls the energization of the water heater 23 by closing the power switch 24 to connect power to the thermostatically controlled electric water heater 23. The electric water heater 23 will then be energized to heat the water in it whenever power is called for by the thermostat of the water heater 23. If the system determines that it is not a holiday or a weekend, the system allows energization of the water heater 23 by closing power switch 24 if it is a non-peak time, and prevents energizing the water heater 23 by opening the power switch 24 if it is a peak time. The system also checks to see if any conditions exist which may override the determination by the system to either supply or not supply energy to the water heater 23. The EEPROM 14 contains several variables which are used in this determination.

In particular, the customer may override the system so that the water heater 23 can be energized during a peak hour. To initiate a customer override, the customer presses the override button 21 which causes the CPU 12 to close the power switch 24 and apply power to the water heater 23. In response to the customer pressing the override button 21, the CPU 12 reads the time from the clock 15, adds the amount of time for which the override is to last, and saves the resulting time, which is the time that the override will end, into the RAM 13. The system will continue applying power to the water heater 23 until the override end time. At the override end time, the system will revert back to normal operation, and will either energize or not energize the water heater 23 depending upon whether it is a peak or non-peak time. The system must be enabled for this function in order for the customer to invoke it. It is enabled by setting a variable referred to as the customer override end time flag in the EEPROM 14. The entire system can also be disabled by programmatically setting a unit killed variable so that the system will not energize the water heater 23 during either peak or non-peak hours.

Similarly, a serviceman can override the system by plugging a modular unit into the external module 22 and issuing a particular command sequence. This allows the serviceman to test the system during peak hours when normally the system would not be energizing the water heater 23. As with the customer override, this is for a set period of time. This amount of time is added to the present time in the clock 15, and then stored as the service override end time in the RAM 13. The system will permit energization of the water heater 23 until this time expires, after which the system will return to normal operation.

The system also overrides the normal operation of cutting off power to the water heater 23 during peak hours when the system has been off for an extended period of time. The reason for this override is that after the system is down, for example as a result of repairs to the system, it is desirable to heat the water in the water heater 23 to its desirable temperature, and then revert to normal operation. Consequently, when the system starts up again after a shut down, if it happens to start up during a peak period during which energy is not normally supplied to the water heater 23, energy is supplied to the water heater 23 so that the water is initially heated up. The length of this override is added to the present time in the clock 15, stored in the RAM 13, and this figure represents the time that this override will terminate. The time stored in the RAM 13 is referred to as the start up override end time, and it is at the start up override end time that normal operation will resume.

If the customer is on vacation, he or she can place the system into vacation mode by pressing the vacation button 26. The system responds to this action by recording the vacation start time. Upon returning from vacation, the customer presses the vacation button 26 again, and the system compares the current date and time with the date and time that the customer started his or her vacation. If the customer was on vacation for an extended period of time, the system goes into a start up override operation so that the customer gets hot water right away.

The system also has a feature known as start up override pending. This feature is involved when the system has been off for an extended period of time, and it comes back on again at the end of a non-peak period resulting in the incomplete heating of the water. When the system determines that it is starting up at the end of a non-peak period, it sets the start up override pending variable. Consequently, when the system then goes into the peak period, and the start up override pending variable is set, it goes into a start up override to get the water in the water heater 23 up to proper temperature before it goes into its peak mode of cutting off power to the water heater 23.

B. Data Protection and Error Recovery

The present invention improves upon the above described energy controller by protecting the data in the EEPROM 14 and clock 15 and recovering from any data errors in the RAM 13 and the clock 15. The power failure detector 25 monitors the power supply and detects any electrical disturbances in the system such as power flicker, power surges or electrical noise, notifies the CPU 12 of such a disturbance, and the CPU 12 enters a blocking phase and sets a blocking time which determines how long the blocking phase will last. The blocking phase allows the CPU 12 to write to the RAM 13, but prevents the CPU 12 from writing to the non-volatile memories of the EEPROM 14 or clock 15. Therefore, if any corruption of the data on the signal lines 17 occurs because of the electrical disturbance, only the data in the RAM 13 will be affected, not the permanent data in the EEPROM 14 or the clock 15. The data in the EEPROM 14 is worthy of protection since all of the critical data which determines whether or not to energize the water heater 23 is permanently stored in the EEPROM 14. This data includes all of the above-described variables such as the startup override end time, the calendar information such as the dates of holidays, the counters to keep track of the days, dates and year, and the algorithm which calculates when to energize the water heater 23 and when to cut off power to the water heater 23. Corruption of this data would cause the system to malfunction. The data maintained in the clock 15 is also crucial to the proper operation of the system since the energization of the water heater 23 is dependant upon the system being able to determine the correct time.

After expiration of the blocking phase, the chance of data corruption because of the electrical disturbance has passed. The CPU 112 then performs a cyclical redundancy check (CRC) on the data in the RAM 13, and an algorithmic check on the data in the clock 15, to determine if the electrical disturbance caused a corruption of the data. If an error occurred, the system enters a recovery phase in which it copies the contents of the EEPROM 14 to the RAM 13 and the contents of the clock memory to the clock 15 to assure that both the RAM 13 and the clock 15 contain non-corrupted data. The CPU 12 also periodically checks the data in the RAM 13 and the clock 15 even if there have been no electrical disturbances and restores the data if it has become corrupted.

Figure 2:
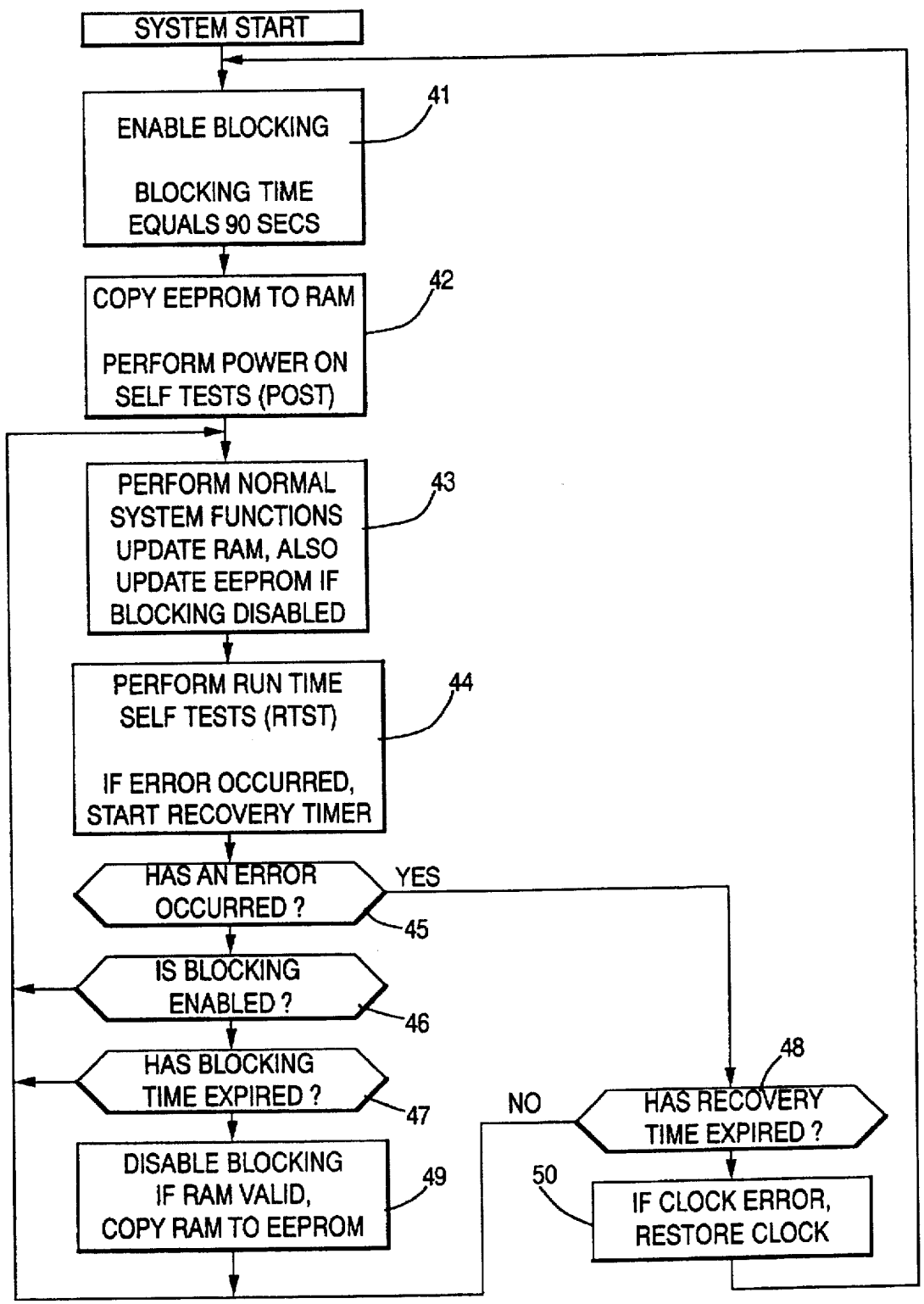
FIG. 2 is a flow chart of the data protection and data correction functions of the present invention.

FIG. 2 is a flow chart of the program executed by the CPU 12 to carry out the just described data protection and data recovery function of the invention. When the system first starts up, the power failure detector 25 detects the start up, and the CPU 12 enters instruction sequence 41 which enables the blocking phase. This is also the point that the program will return to when the power failure detector 25 detects an electrical disturbance. The blocking phase, as previously stated, prevents the CPU 12 from writing to either the EEPROM 14 or the clock 15. The reason for preventing writing operations to these non-volatile memory components during system start up is that there is a greater chance that power surges will occur during system start up. Upon expiration of the blocking phase, the system start up is complete and the chance of any power surge resulting from system start up is over.

After enabling the blocking phase and before the blocking phase has expired, the CPU 12 executes instruction sequence 42. Instruction sequence 42 includes a power on self test (POST) which tests the EEPROM 14, the RAM 13, the clock 15, and various variables in the system. After this testing, instruction sequence 42 causes the RAM 13 to be initialized by copying the contents of the EEPROM 14 to it. The EEPROM 14 serves as permanent storage for the data in the system, and the RAM 13 acts as a workspace for the system before the data is written to the EEPROM 14.

After completion of the power on self test, the CPU 12 enters normal operation mode beginning with instruction sequence 43. The functions associated with normal operation mode include the CPU 12 using the data in the RAM 13 and the time in the clock 15 to determine whether or not to close the power switch 24 and permit energization of the water heater 23. By working with the data in the RAM 13, and updating any variables in the RAM 13, the CPU 12 can verify the data before it is written to the EEPROM 14, thereby protecting the data in the EEPROM 14. If the blocking phase is disabled, and if the blocking time has expired, the contents of the RAM 13 are copied to the EEPROM 14 in order to keep the contents of the EEPROM 14 current. The system also saves the current time in the clock 15 to the memory of the clock 15 once per minute.

The operation of the system continues by executing instruction sequence 44 which includes a run time self test (RTST). In the run time self test, the system performs a cyclical redundancy check (CRC) on the data in the RAM 13, and it executes a simple algorithm to determine if the clock has a corrupted time in it. The cyclical redundancy check is a test well known among those in the art and is used to check for errors in digital data. The system determines if there is an error in the data in the clock 15 by a series of simple data checks. These checks include determining whether the hour is between 1 and 12 inclusive, the minute is between 0 and 59 inclusive, the date is between 1 and 31 inclusive, and the month is between 1 and 12 inclusive. If all of these conditions are met, the data in the clock 15 is valid.

If instruction 45 determines that no error has occurred, i.e. neither the data in the RAM 13 nor the clock 15 is corrupted, the system checks in instruction 46 whether the blocking phase is enabled. If the blocking phase is not enabled, the program loops back to instruction sequence 43. If blocking is enabled, instruction sequence 47 checks to see if the blocking time has expired. If the blocking time has not expired, the CPU 12 loops back to instruction sequence 43. Otherwise, if the blocking time has expired, and the data in the RAM 13 is valid, instruction sequence 49 disables the blocking phase, copies the contents of the RAM 13 to the EEPROM 14, and returns the program to instruction sequence 43.

However, if an error has occurred, either because the data in the RAM 13 or the clock 15 is invalid, the CPU 12 enters the recovery phase in instruction sequence 44 and then branches from instruction 45 to instruction 48. During the recovery phase, the CPU 12 also causes the electric switch 24 to be opened or closed depending upon the setting of a control flag. This control flag is set by connecting a hand held microprocessor unit to the external module 22 and issuing the proper commands.

The system, upon detecting an error in instruction sequence 44 and entering the recovery phase, sets a recovery time during which the system waits for the completion of the recovery phase before restoring the clock. After expiration of the recovery phase, instruction sequence 50 checks to see if the error was a clock error. If it was a clock error, the CPU 12 restores the clock by reading the time saved in the memory of the clock 15, and resets the clock with that time. After the correction of the time in the clock, the system returns to instruction sequence 41. Blocking is enabled once again, and the contents of the EEPROM 14 are copied to the RAM 13 thereby correcting any data corruption that occurred in the RAM 13.

If the recovery time has not expired when the program executes instruction sequence 48, the program loops back to instruction sequence 43. The program will then continue to loop through instruction sequences 43, 44 and 48 until the recovery time expires and the program loops back to instruction sequence 41. While the program loops through instruction sequences 43, 44 and 48 waiting for the recovery time to expire, it keeps track of the occurrence of holidays and peak and non-peak times, but it does not act to either energize or to prevent the energization of the water heater 23. As explained above, the switch 24 is either opened or closed during the recovery phase, and the switch will not be changed until the system is restarted and it enters normal operation once again.

While the invention has been described in terms of the aforementioned embodiments, those skilled in the art will recognize that the invention can be practiced with modification within the spirit and scope of the appended claims.

I claim:

1. A method for protecting the data of and recovering from data errors in an energy controller for an electric water heater, said energy controller comprising a central processing unit (CPU) logically connected to a random access memory (RAM), an electronically erasable programmable read only memory (EEPROM), and a clock with a small amount of memory, comprising the steps of:

initiating a blocking phase upon the start up of said energy controller;

monitoring the power supply to said energy controller for electrical disturbance;

initiating said blocking phase upon the detection of a disturbance in said power supply;

preventing said CPU from writing to said EEPROM and said clock during said blocking phase;

copying the contents of said EEPROM to said RAM after initiating said blocking phase;

performing an error check on the contents of said RAM;

performing a validity check on the contents of said clock;

copying the contents of said RAM to said EEPROM after said blocking phase in the event that no error occurred; and restoring said clock from said clock memory if an error is detected in said clock.

2. The method according to claim 1, wherein said EEPROM contains information including an algorithm, the dates of holidays, and counters to track the day, date, year, and the number of occurrences of each day per month, said information being used by said energy controller in determining whether to energize said water heater.

3. The method according to claim 1, wherein said validity check of the contents of said clock comprises the steps of:

verifying that the hour in said clock is between 1 and 12 inclusive;

verifying that the minutes in said clock is between 0 and 59 inclusive;

verifying that the date in said clock is between 1 and 31 inclusive; and verifying that the month in said clock is between 1 and 12 inclusive.

4. The method according to claim 1, wherein said electrical disturbance comprises a power surge.

5. The method according to claim 1, wherein said electrical disturbance comprises a power flicker.

6. The method according to claim 1, wherein said electrical disturbance comprises electrical noise.

7. The method according to claim 1, further comprising setting a recovery time period when said error check detects an error in contents of said RAM or said validity check detects an error in said clock and initiating said blocking phase after said recovery time period.

8. The method according to claim 7, further comprising the steps of:

copying the contents of the memory of said clock to said clock at the end of said recovery time period if the error was in said clock; and entering said blocking phase at the end of said recovery time and then copying the contents of said EEPROM to said RAM after said blocking phase.

9. A system for protecting the data of and recovering from data errors in an energy controller for an electric water heater comprising:

a central processing unit;

an electronically erasable programmable read only memory logically connected to said central processing unit, said electronically erasable programmable read only memory containing information used for the operation of said system;

a random access memory logically connected to said central processing unit, said random access memory containing a copy of said information from said electronically erasable programmable read only memory;

a clock with a small amount of memory logically connected to said central processing unit;

a power switch logically connected to said central processing unit;

a power failure detector logically connected to said central processing unit;

a power supply to supply power to said central processing unit, said electronically erasable programmable read only memory, said random access memory, said clock, said power failure detector, and said electric switch;

external inputs logically connected to said central processing unit; and an electric water heater connected to said power supply through said switch;

said central processing unit utilizing said information in said random access memory to close said electric switch thereby allowing the thermostatic supply of energy to said water heater, and said central processing unit utilizing said information in said random access memory to open said electric switch thereby cutting off power to said water heater;

said central processing unit updating said electronically erasable programmable read only memory with data from said RAM when not in a blocking phase; and said central processing unit entering said blocking phase in response to a disturbance in said power supply.

10. The system according to claim 9, wherein said information of said random access memory includes an algorithm, the dates of holidays, and counters to track the day, date, year, and the number of occurrences of each day per month.

11. The system according to claim 9, wherein said central processing unit closes said electric switch during non-peak hours thereby allowing the thermostatic energization of said water heater, and further wherein said central processing unit opens said electric switch during peak hours thereby preventing the energization of said water heater.

12. A method of protecting data in an energy controller for an electric water heater, said energy controller comprising a central processing unit (CPU) logically connected to a random access memory (RAM), an electronically erasable programmable read only memory (EEPROM) and a clock, said energy controller controlling the application of electric power to said water heater in accordance with calendar information stored in said EEPROM and said RAM, comprising the steps of monitoring the power supply to said energy controller for electrical disturbance, initiating a blocking phase upon detection of a disturbance in said power supply, preventing said CPU from writing to said EEPROM during said blocking phase, copying the contents of said EEPROM to said RAM after initiating said blocking phase, and copying the contents of said RAM to said EEPROM after said blocking phase.

13. A method of recovering from data errors in an energy controller for an electric water heater, said energy controller comprising a central processing unit (CPU) logically connected to a random access memory (RAM), and electronically erasable programmable read only memory (EEPROM), said energy controller controlling the application of electric power to said water heater in accordance with calendar information stored in said EEPROM and said RAM, comprising performing the steps of performing an error check on the contents of said RAM, entering a recovery phase upon detection of an error in the contents of said RAM, copying the contents of said RAM to said EEPROM except during said recovery phase, and copying the contents of said EEPROM to said RAM after said recovery phase.

14. A method as recited in claim 13, wherein said energy controller further comprises a clock having a memory, said method further comprising performing a validity study on the contents of said clock, initiating said recovery phase upon detection of an error in said clock, and restoring said clock with data from said memory after the end of said recovery time.

* * * * *